Oct. 19, 1954   J. D. CUMMINGS ET AL   2,692,006
PIPE PROTECTION MACHINE
Filed Jan. 26, 1950   2 Sheets-Sheet 1

Inventors
James D. Cummings
Irvin L. Jones

By Lester B. Clark
& Ray L. Smith
Attorneys

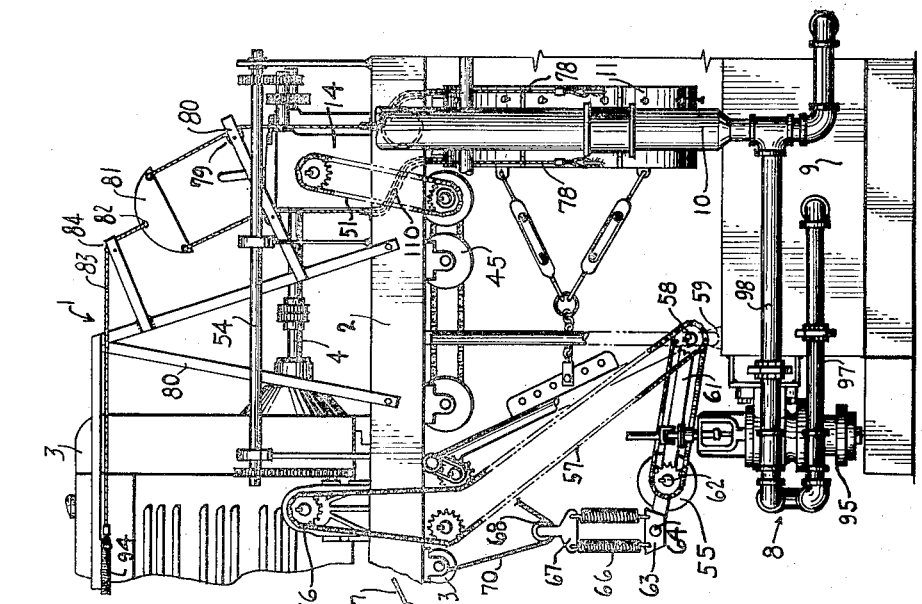
Fig. 3
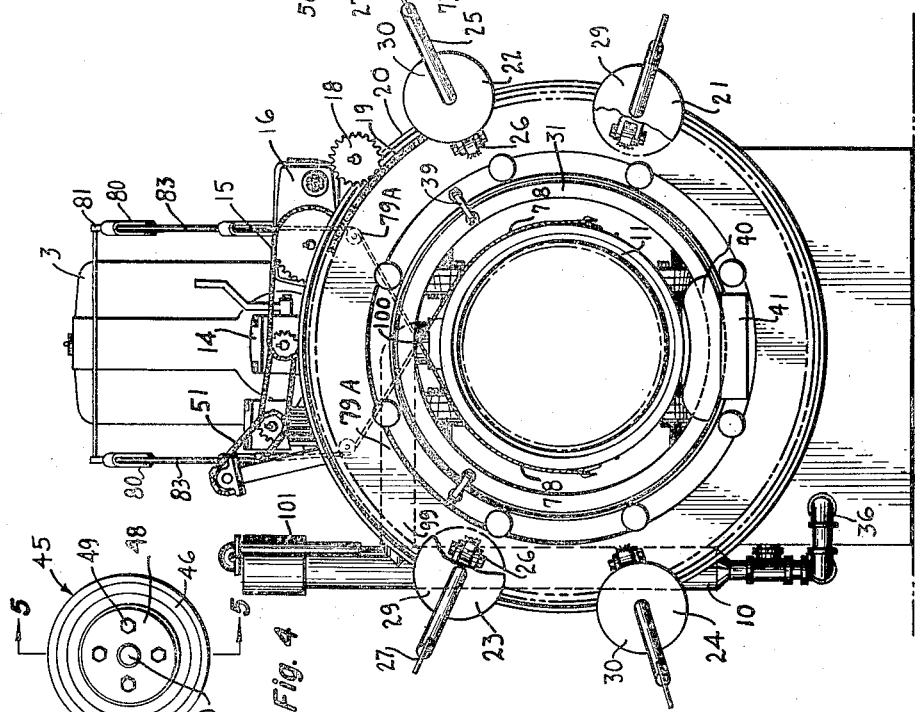
Fig. 2
Fig. 4
Fig. 5
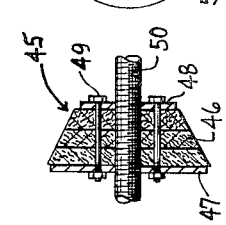
Inventors
James D. Cummings
Irvin L. Jones
By
Lester B. Clark
Ray L. Smith
Attorneys.

Patented Oct. 19, 1954

2,692,006

UNITED STATES PATENT OFFICE 2,692,006

PIPE PROTECTION MACHINE

James D. Cummings and Irvin L. Jones, Houston, Tex., assignors to Johns-Manville Corporation, New York, N. Y., a corporation of New York, and Crutcher-Rolfs-Cummings, Houston, Tex., a corporation of Texas Application January 26, 1950, Serial No. 140,591

5 Claims. (Cl. 154—41)

This invention relates to pipe protection machines, and is an improvement of prior Patent No. 2,359,751, granted October 10, 1944, and of copending patent application Serial No. 36,689, filed July 2, 1948, now Patent No. 2,583,819. More particularly the invention deals with a machine for applying a corrosion resistant coating on the outside of a conduit such as a continuous line of piping and wherein the coating is applied by spreading a hot tarry substance on the pipe followed by one or more helical wrapping of binder strip such as felt and/or heavy paper.

It is an object of this invention to provide a pipe protection machine which has features thereon adapted to permit an infinitely accurate control of the wrapping thereof.

It is a further object of this invention to provide a pipe protection machine of this class in which the wrapping control device is conveniently located for manual manipulation by an operator who is in a position, at the same time, to closely observe the application of the wrapping material about the pipe.

It is also an object of this invention to provide a pipe protection machine of this class which has means thereon to apply heated coating material to the pipe area which will first be wrapped when a stopped machine resumes operation.

It is a further object of this invention to provide a pipe protection machine of this class which has substantially diametrically opposed pairs of wrapping heads thereon with adjacent heads extending different distances from the wrapping ring on which they are mounted.

It is also an object of this invention to provide a pipe protection machine of this class which has pipe engaging wheels thereon of a plastic composition so as to grip the pipe without injuring the wall thereof.

It is yet another object of this invention to provide a pipe protection machine of this class which has an easily manipulated ratchet actuated shoe adjustment device thereon.

It is yet another object of this invention to provide a pipe protection machine of this class which has a ratchet-operated means thereon for adjusting the contact of the traction wheels with the lower side of the pipe being processed.

It is a further object of this invention to provide a pipe protection machine of this class which has lines connected to the coating shoe and crossed thereabove and extending upward over pulley means on the frame to a pawl and ratchet tightening device; there being a spring in the line to lend yieldability thereto.

It is yet a further object of this invention to provide a pipe protection machine of this class in which the traction wheels on the under side of the pipe are positively driven.

Other and further objects of this invention will be obvious when the specification is considered in connection with the drawings, in which:

Figure 2 is a rear elevation of the machine;

Figure 3 is a side elevation of the machine taken on the side opposite that shown in Figure 1;

Figure 4 is a view of a traction wheel of the machine;

Figure 5 is a section taken along the line 5—5 of Figure 4.

Figure 1:
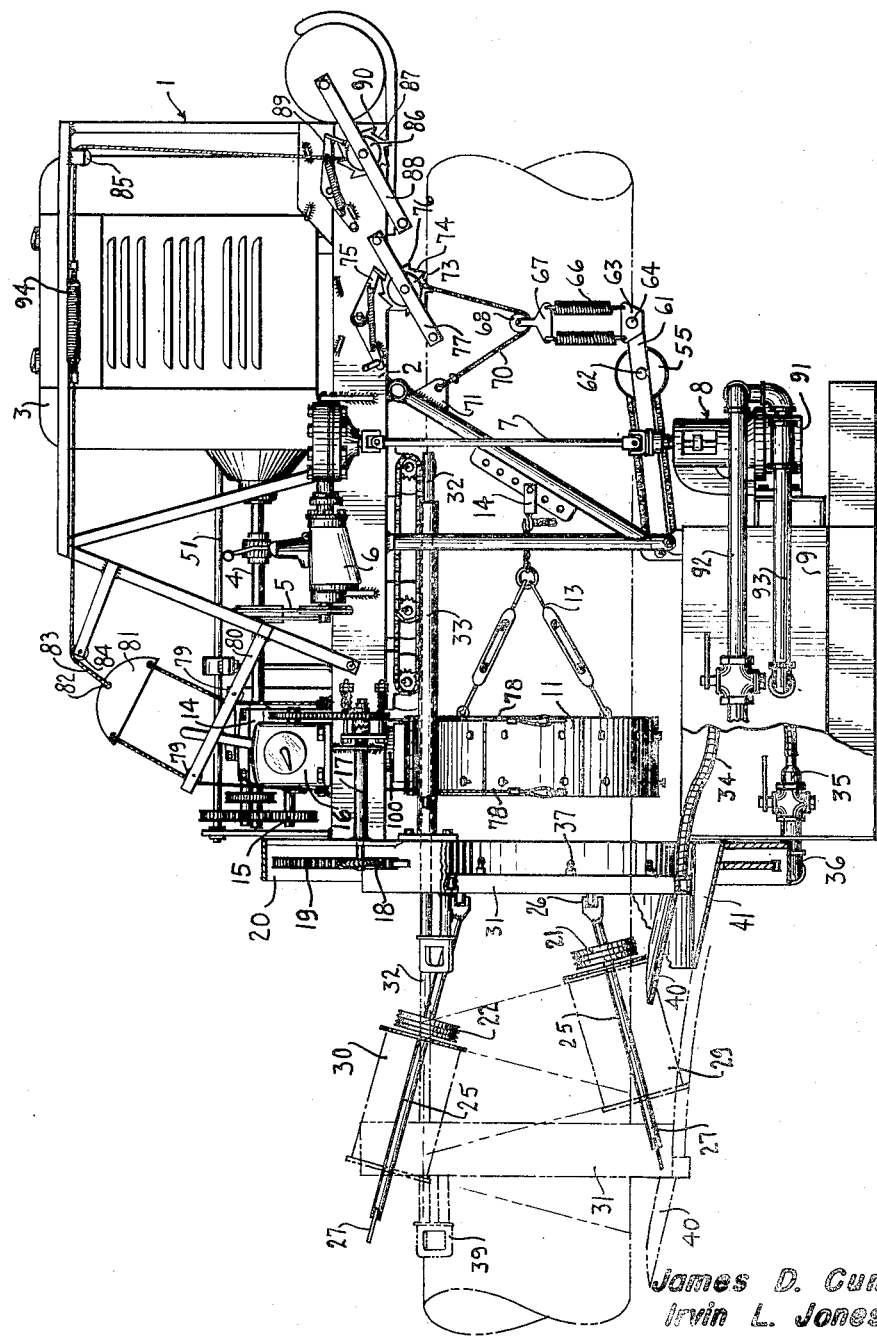
Figure 1 is a side elevation of the machine.

In present conventional pipe protection machines, any variation from a co-ordinated balance between the speed with which the pipe moves through a stationary machine, or the speed with which the machine moves along the pipe, and the speed with which the wrapping ring of the wrapping head rotates, may result in an uneven application of wrapping material supplied to the pipe by the wrapping heads which are rotatable with the wrapping ring. This variation or over-balance of speeds between the ring and the longitudinal movement of the pipe, or machine, as the case may be, will cause an uneven application of wrapping material to the pipe and will result in an undesired overlap of one layer of wrapping material over the other in machines of the double-wrap, single-coat type herein disclosed.

Also, in conventional machines it has been found that when a machine is stopped in service for some reason, and then started up again after the coating material between the coating shoe and the last wrapped area of the pipe has had time to cool, the wrapping material first applied when the machine resumes operation will not bind or adhere to the coated pipe, as in cases where the pipe surface next to be wrapped may receive a fresh application of heated coating material thereon.

Additionally, in conventional machines of the double-wrap class, which may apply two different types of wrapping material, as felt and as fiber glass, it is of importance to maintain a balanced and uniform overlap of the materials applied, but such cannot be done when there is not a definite synchronization between the speed at which the machine drive develops traction and the speed at which the wrapping ring rotates. Also, even in a synchronized machine, the longitudinal progress of the machine along the pipe may be slowed down as when it goes uphill, and this will result in more than the ordinary amount of overlap between the layers of material.

It has also been found that the metallic wheels heretofore employed in pipe protection machines tend to score or injure the surface of the pipe being processed, and traction wheels have been sought which will bring about relative motion between the machine and the pipe being processed without scoring or in any way injuring the pipe.

It has also been an objection to conventional machines of this class that heretofore no means has been definitely provided whereby the operator of the machine may adjust the coating shoe about the machine from his position on the operator's platform.

Additionally, conventional machines have not heretofore had the wheels on the under side of the pipe retractably mounted while driven by a positive driving means.

The objections hereinabove listed are sought to be remedied in this invention, which includes a pipe protection machine 1 having a frame 2 on which is mounted a prime mover 3, as a gasoline engine. The engine has a shaft 4, which, through a V-belt 5, drives a transmission 6, which in turn operates through a right-angle drive 7 to drive pumping means 8, which transfers fluid from a sump 9 through a header 10 into a coating shoe 11 which surrounds the pipe and which is connected by turnbuckle and chain means 13 to the frame at 14.

The shaft 4 also drives transmission 14, and this transmission, through suitable sprocket, chain, and shaft arrangement 15, drives the transmission 16, which is of the infinitely variable speed type. This transmission 16, in turn, through suitable sprockets, chains, and shafts 17, drives the sprocket 18, which meshes with the sprocket rim of the wrapping ring 19 to drive the ring around within the ring housing 20. As best shown in Fig. 1, the transmission 16 has at its side conveniently available to the operator a ratio setting control lever or handle by which the rotational speed transmitted may be varied for manually regulating the travel of the rotating ring 19 in relation to the forward travel of the machine.

The wrapping ring 19 carries wrapping heads 21, 22, 23, and 24. These heads are mounted on shafts 25, which are pivotally mounted at 26 on the ring 19; the shafts having conventional locking means 27 thereon by which they may be rigidly locked after being pivoted to a desired angle. As shown most clearly in Fig. 1, the wrapping head 21 is located closer to the wrapping ring 19 than is the wrapping head 22; and in operation the heads, containing the material drums 29 and 30 thereon, unwind the drum material at different angles so that, for instance, a drum 29 of a material, as fiber glass, may receive thereon a wrapping material, such as paper or felt, which follows along after the leading drum 29 at a desired angle of rotation. This feature, by which alternate drums are spaced at different distances from the wrapping ring 19, and by which their shafts 25 may be set at various angles to the face of the ring 19, determines the overlap of one material over the other.

It is noticeable that the heads 23 and 24 are spaced, respectively, diametrically opposite the heads 21 and 22, and that each pair of diametrically opposed heads is closely spaced with respect to the other head of its individual pair, so that any small angle, as, say 30°, is intercepted by lines extending from the head axes to the center of the pipe being processed. This angle of 30°, however, is not a critical angle, and the heads will work on the same principle, but with lesser efficiency, as the angle between the heads of each pair approaches 90°.

In practice, the machine 1 may apply a double composition wrap to a coated pipe, as, for instance, in sequence, a layer of fiber glass imposed over a layer of coating material, followed by a layer of felt over the fiber glass, followed by a second layer of fiber glass over the felt, and finally a second layer of felt over the top fiber glass layer. This type of processing may be rapidly applied by machines of the type of this invention, since the adjacent heads, are relatively close together in paired relationship, and since alternate heads are 180° apart, and these features combined with other features of adjustment make it possible to insure proper pitch of the wrap and proper overlap.

In cases where it may be necessary to stop a machine during processing, and then start the machine again, an auxiliary ring 31 is provided for applying a primer coat. This ring 31 is connected by handles 39, to rods 32 which slide within the pipes 33 on the frame 2.

A hose 34 is connected to the ring 31 and to the valve 35 within the sump 9 so that the pumping system 8 may pick up fluid from the sump and supply it through the connection 36, valve 35, and hose 34 to the ring 31 from which it may be spread outwardly through nozzles 37 to coat the pipe surface between the shoe 11 and the point on the pipe at which the wrapping previously terminated.

The apron 40 is provided to receive the dripped coating material, when the ring is extended as shown by the dotted lines in Fig. 1, and both the apron 40 and the larger apron 41 receive the dripped coating material from the pipe when the ring 31 is not in use and is pushed back within the housing 20.

The traction for the machine is obtained by suitable sprockets, chains, and shafts 51 which are driven by transmission 14, and which in turn drive the upper traction wheels 45. Traction is also imparted to the lower wheels 55, of similar composition to the wheels 45, by means of suitable sprockets, shafts, chains, and bearings 54, which drive the speed reducer 56, which in turn, through a suitable transmission 57 of sprockets, chains, shafts, and bearings, immediately drives these lower traction wheels. The shaft 58 of the transmission 57 is mounted on brackets 59, which are rigidly connected to the sump 9 and which extend thereabove. From the shaft 58 the arms 61 extend forwardly therefrom and are pivoted thereon, and these arms outwardly have the shaft 62 journaled therein, which shaft has thereon the lower traction wheels 55. Each arm 61 terminates in a stud 64, over which is slid a bracket 63, which is connected by means of springs 66 to a pulley bracket 67, on which is mounted a pulley 68.

Inwardly a line 70 is connected into a lug 71 on the frame 2, and outwardly the line 70 extends around a pulley drum 73 mounted on and extending below the frame 2, which has a ratchet 74 on the shaft thereof so that a pawl 75 pivotally mounted thereabove on the side of the frame 2 may contact the ratchet teeth 76. Thus when the arm or lever 77 is turned in a counterclockwise direction, as viewed in Fig. 1, the line 70 is wound up on the drum pulley 73 to increase the tension or pull of the springs 66 on the arms 61 to move them upwardly thereby bringing the wheels 55 into tighter gripping contact with a pipe being processed. This may also be done initially to grip a pipe which may be of smaller diameter than the last pipe which the wheels have finished transferring.

It has been found desirable in machines of this type to provide an easy means of adjusting the fitting of the segment shoe 11, which applies the coating to the pipe. This is accomplished by cable means as the lines 78, which are connected to the shoe and cross thereabove and extend upwardly over pulleys 79A, mounted on the frame 2, as shown in Fig. 2, and over pulleys 79, which are mounted on the bracing 80 of the frame 2, as shown in Figs. 1 and 3. The line on each side is then connected to a semicircular plate 81.

Each plate at 82 has a part of the cable means comprising a line 83, connected thereto which extends over a pulley 84, also mounted on the bracing 80. Each line 83, in turn, has a tension spring 94 therein, and extends at the forward end of the machine over a pulley 85 mounted on the bracing 80, and down to a winch drum 86, which has thereon the ratchet 87 and the handle 88.

The line 83 is wound around the winch drum 86, and when the handle 88 is rotated in a counterclockwise direction by the operator, as shown in Fig. 1, the line 83 is wound up further on the winch drum 86 so that the pawl 89, pivotally mounted on the frame 2 above the mounting thereon of the winch drum 86, may make contact with the teeth 90 of the ratchet 87.

This arrangement provides a novel means of positively tightening and adjusting the shoe around the pipe, and such adjustment may be accomplished by an operator on the frame above the pipe, or by one standing on the ground. The gradient of adjustment is such that the proper tightness of shoe around the pipe may be constantly maintained, while at the same time limited resilience exists in the fitting to permit the accommodation of irregularities in pipe diameter.

The pumping means 8 or fluid transfer system of this invention comprises a pump 91 on the forward side of the sump 9, which picks up fluid, as bitumen or asphalt, from an exterior source, as through the line 92, which flexibly connects to a portable tank, not shown, and discharges this fluid out through the line 93 into the sump 9. A pump 95 on the forward side of the sump opposite the pump 91, as shown in Fig. 3, picks up fluid from the sump by means of the line 97 and discharges it through the line 98, header 10, and spout 99, into the top 100 of the shoe 11. An accumulator 101, which also serves as a bubble trap and vent, is provided as an extension of the header 10 above the spout 99.

The fact that the pumps are positively driven by the right-angle drive 7, and from the transmissions 6, insures that a variable amount of coating fluid may be applied to the pipe, and provides an accurate and positive control of its distribution.

As it has been found that metal wheels, as steel wheels, will score or injure a pipe being processed, it has become necessary to provide a wheel of some plastic or fabricated material which is sufficiently hard to grasp the pipe surface to move along the pipe and deliver adequate traction and yet which will not mar or score the pipe. This invention considers a composition traction wheel 45 comprised of layers 46 of a plastic or fabric material held together between plates 47 and 48, as by the bolts 49; the wheels being threadable upon the shaft 50 so that they may be adjusted inwardly or outwardly to ride pipes of various diameter.

Obviously, as shown in the drawings, the layers must be tapered, as shown in Figs. 4 and 5 to grasp an adequate arc of the periphery of the pipe. Each layer 46, and also the assembly of layers, are of frusto-conical shape. The weight of the machine supported upon the wheels, and the resiliency of the material thereof which contacts the pipe, obviously conform the periphery of the wheels to substantially the curvature of the pipe to accomplish satisfactory traction.

To avoid possible confusion the feature of construction is pointed out by which the lines 78, as shown in Fig. 1, extend directly upward to the pulleys 79, whereas the lines 78, on the opposite side of the machine, as shown in Fig. 3, extend through the offsetting tubes 110 and then to the pulleys 79, thereby avoiding interference with the traction elements 51 and 54, as they are shown located in this figure.

This invention broadly considers an improved pipe protection machine which is adapted to accurately and positively control the coating and wrapping of pipe processed thereby by providing a novel wrapping head arrangement; a novel infinitely variable speed control unit at a point where the operator may closely observe the wrapping operation as he manually operates the control handle at will and independently of power transmission for machine travel; and a novel and easily manipulated arrangement whereby the coating shoe may be accurately and easily adjusted to encircle pipe. This invention also considers a means of applying a primer coat by means of an auxiliary spray ring so as to insure bonding of wrapping material to the coated pipe when the machine is first started up. It further considers traction wheels which are of a material not adapted to score or mar the pipe; and it considers lower pipe gripping wheels of this type which are positively driven while being pivotally mounted and adjustable.

What is claimed is:

1. A machine for applying protective materials to pipe comprising, a frame, upper traction wheels mounted on said frame for driving engagement with the upper side of said pipe, a lever mounted on said frame, lower traction wheels carried by said lever, a spring joined at one end to said lever, line means connected to the other end of said spring, a line wind-up drum journalled in said frame, ratchet and pawl means co-operating with said drum, an operating handle to rotate said drum to draw said lower traction wheels upwardly into yieldably locked driving engagement with the lower side of said pipe, means connected to said frame for applying protective materials to said pipe, and power means mounted on said frame and connected to drive said protective materials applying means and said upper and lower traction wheels.

2. A machine as claimed in claim 1 in which said materials applying means includes a wrapping head rotatably surrounding said pipe to apply overlapping layers of wrapping material thereto, a hollow spray ring surrounding said pipe with spray nozzles directed toward the pipe, rod means slidable in said frame and connected to support said ring for travel to and fro in relation to said head, a pump to supply pipe coating liquid and a flexible connection between said ring and said pump to accommodate to and fro travel of said ring while transmitting spray liquid thereto.

3. A machine as claimed in claim 1 in which said materials applying means includes a wrapping head mounted to rotate about said pipe and to apply overlapping layers of wrapping material thereto, and in which the drive connection to the wrapping head includes an infinitely variable speed transmission for varying the speed of the head independently of the rate of linear travel of the machine imparted by the traction wheels and a manual control for said transmission located adjacent to said wrapping head.

4. In a pipe wrapping machine of the character described, a carriage arranged for the relative travel of the pipe and carriage linearly of the pipe, a carrier of pipe wrapping material mounted on the carriage for travel in a circular path around the pipe to apply a helical wrap incident to the circular travel simultaneously with relative linear travel, a traction wheel mounted on the carriage to track on the pipe for effecting relative linear travel, a source of power, a power divider receiving drive from said power source, drive transmitting means connecting the power divider through one path with the traction wheel and through another path with the pipe wrapping material carrier, said means through the last mentioned path including a variable speed motion transmitting device operable at will to change the rate of carrier travel in relation to the rate of relative linear travel and thereby regulate the spacing of successive wrapping, and a manual control for said device adjacent the position of the carrier.

5. A machine for applying protective materials to pipe comprising, a frame, traction wheels mounted on said frame for driving engagement with the pipe, means connected to said frame for applying protective coating materials to said pipe, and power means mounted on said frame and connected to drive said protective materials applying means and said traction wheels, said materials applying means including a wrapping head rotatable about said pipe to apply overlapping layers of wrapping materials thereto, the drive connection to said head including an infinitely variable speed transmission and a control handle therefor operatable at will independently of the drive connection to said traction wheels and located adjacent to said wrapping head, said materials applying means also including a hollow shoe extending around said pipe and having a liquid inlet into the top of said shoe, said materials applying means also including a pump to supply liquid through said inlet into said shoe to coat said pipe, cable means having a resilient portion therein and being connected to said shoe at one end, a drum journalled in said frame, a ratchet and pawl means cooperating with said drum, the other end of said cable means being connected to said drum, handle means to rotate said drum to tighten said shoe in yieldably locked engagement with said pipe, and draft means connecting said shoe to said frame.

References Cited in the file of this patent

UNITED STATES PATENTS

| Number | Name | Date |
|---|---|---|
| 244,126 | Herschel | July 12, 1881 |
| 1,501,028 | Guay | July 8, 1924 |
| 1,512,560 | Moore | Oct. 21, 1924 |
| 2,041,337 | Harrison | May 19, 1936 |
| 2,253,848 | Cummings | Aug. 26, 1941 |
| 2,340,326 | Horrigan | Feb. 1, 1944 |
| 2,344,264 | Perrault | Mar. 14, 1944 |
| 2,359,751 | Cummings et al. | Oct. 10, 1944 |
| 2,373,638 | Perkins | Apr. 10, 1945 |
| 2,583,819 | Cummings | Jan. 29, 1952 |